United States Patent Office 3,445,517
Patented May 20, 1969

3,445,517
ARYL ACETAMIDINES
Jack Mills, Indianapolis, Ind., assignor to Eli Lilly and Company, Indianapolis, Ind., a corporation of Indiana
No Drawing. Filed June 3, 1966, Ser. No. 554,962
Int. Cl. C07c *123/00;* A61k *27/00*
U.S. Cl. 260—564      4 Claims

ABSTRACT OF THE DISCLOSURE

Various ar-substituted phenylacetamidines of the group

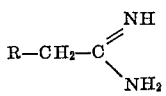

wherein R is o-tolyl, o-chlorophenyl, or α-naphthyl, and their salts, useful as hypotensives without the concomitant monoamine oxidase inhibition side effect.

---

This invention relates to a method for the treatment of hypertension, employing a novel series of amidine compounds and therapeutic compositions thereof having the property of lowering blood pressure in hypertension.

The novel compounds useful in the present invention can be represented by the structural formula:

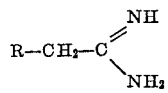

wherein R represents phenyl, o-tolyl, m-tolyl, o-chlorophenyl, m-chlorophenyl, p-chlorophenyl, 3,4-dichlorophenyl, or α-naphthyl, as well as the acid addition salts thereof with pharmaceutically acceptable acids formed illustratively with hydrochloric, hydrobromic, phosphoric, naphthalenesulfonic, sulfuric, and like acids.

In carrying out the novel therapeutic method of this invention, an amidine represented by the above formula, or an acid addition salt thereof, is administered to a patient suffering from hypertension. The dosage level employed varies according to the need of the patient and is dependent upon the specific drug used and the type and severity of the hypertension. For most hypertensive patients, the daily administration of from 1 to 500 mg. of the amidine, usually in the form of a non-toxic pharmaceutically-acceptable acid addition salt, serves to reduce the blood pressure to a safe level and maintain it at that level. The appropriate dose can be given at one time during the day or it can be divided into fractional parts and given several times during the day, as for example, with meals. The compounds can be given by either the parenteral or oral route. The compounds of the present invention are orally effective, however; and the oral method of administration is obviously preferred because of its greater convenience.

Certain of the compounds employed herein, namely those wherein R is o-tolyl, o-chlorophenyl, or α-naphthyl, are quite different from similar prior art compounds used for the treatment of hypertension in that they do not deplete the stores of epinephrine in the heart as determined by an adaptation of the method of Chang, Int. J. Neuro. Pharmcol., 3, 643 (1964). The other compounds employed herein will to some degree deplete these catecholamine stores in the heart when determined in the same manner. The compounds employed herein also possess a greater activity-toxicity ratio than the prior-art compounds. All of the compounds of the present invention fail to deplete the level of catecholamine in the brain, probably for the reason that they are not materially absorbed by brain tissue.

The compounds useful for the method of the present invention can be prepared by the reaction of an alcohol in the presence of anhydrous hydrogen chloride or other hydrogen halide on the appropriately substituted phenylacetonitrile and subsequent reaction of the thus prepared phenyliminoacetate hydrochloride with ammonia. Alternatively, they can be prepared by the method by Schaeffer and Krapcha, J. Org. Chem., 27, 1255 (1962), which involves the treatment of a nitrile with ammonium chloride and ammonia at 150° C. in a high pressure vessel. Both procedures have been illustrated by suitable examples below.

The compounds, in order to be suitable for oral administration, must be formulated into pharmaceutically acceptable tablets, capsules, elixers, suspensions, solutions, troches, or the like. These pharmaceutical forms employ the commonly used extending media and excipients well known to those skilled in the art. In a typical clinical trial, 10 mg. of the hydrochloride salt of a compound herein provided is mixed with a suitable excipient as, for example, starch or milk sugar, filled into a hard-gelatin capsule, and administered orally one to five times a day depending upon the severity of the hypertensive state. The hydrochloride salts of the above compounds are water soluble and can be administered in liquid form utilizing suitable flavoring agents to mask the undesirable flavor of the compound. Alternatively a water-insoluble salt, as, for example, the naphthalenesulfonate salt, can be administered as a suspension in an aqueous medium utilizing suitable coloring and flavoring agents.

The following specific compositions are illustrative of those useful in the therapeutic processes of this invention.

Capsules containing 2-(o-tolyl)acetamidine hydrochloride are prepared by thoroughly mixing 2.50 g. of the salt with 52.50 g. of starch, filling the mixture into telescoping hard-gelatin capsules, 0.22 g. of the mixture being placed in each capsule to provide a dose of 10 mg. of o-tolylacetamide hydrochloride per capsule.

2-(3-chlorophenyl)acetamidine hydrochloride is prepared in tablet form by mixing together 232 g. of the active drug, 1.624 g. of milk sugar, 452 g. of starch, and 12 g. of magnesium stearate, granulating the mixture, and pressing the granulation into scored tablets of such size that each contains about 10 mg. of the active drug.

Capsules containing 2 - (2 - chlorophenyl)acetamidine hydrochloride are prepared by thoroughly mixing 2.85 g. of the drug with 168.15 g. of starch and then filling 550 capsules each with about 0.3 g. of the mixture, thus providing in each capsule a 5 mg. dose amount of the hydrochloride salt.

The following examples will illustrate the preparation of certain compounds useful for the method of the present invention, but are not to be construed as the exclusive embodiments thereof.

EXAMPLE 1

A solution of 18.6 g. (0.1 mole) of 3,4-dichlorobenzyl cyanide, 5.3 g. (0.12 mole) of ethanol, and 130 ml. of chloroform is cooled in an ice bath, and 7.2 g. of anhydrous hydrogen chloride are slowly added while the temperature is held below 10°. Stirring is continued for one hour, and the volatile solvents are removed in vacuo from the reaction product mixture, yielding a white cystalline solid product. This product, ethyl 2 - (3,4-dichlorophenyl)iminoacetate hydrochloride, is washed with 200 ml. of ether, filtered, and dried under vacuum. Yield: 22.8 g. (85% of theory). Melting point: 118–119° C.

A solution of 11.6 g. (0.05 mole) of ethyl 2 - (3,4-dichlorophenyl)iminoacetate hydrochloride in 500 ml. of ethanol is cooled in an ice bath and 500 ml. of anhydrous liquid ammonia are added. The reaction solution is allowed to warm to room temperature and is stirred at room temperature overnight. The solvents are removed in vacuo, and the residue is triturated with 100 ml. of a 1:1 mixture of acetone and ethyl acetate. The crystalline product, 2 - (3,4 - dichlorophenyl)acetamidine hydrochloride, is recrystallized from ethanol-ethyl acetate. Yield: 3.2 g. Melting point: 163–166° C.

Using the appropriately substituted starting materials the following compounds are also prepared by the above method; 2 - (2-chlorophenyl)acetamidine hydrochloride, M.P. 142–145° C.; 2-(α-napthyl)acetamidine hydrochloride, M.P. 172–173° C.; 2-phenylacetamidine hydrochloride, M.P. 145–147° C.; 2-(o-tolyl)acetamidine hydrochloride, M.P. 112–115° C.; 2-(3-chlorophenyl)acetamidine hydrochloride, M.P. 191–193° C.; 2-(4-chlorophenyl)acetamidine hydrochloride, M.P. 189–192° C.; 2-(m-tolyl)acetamidine hydrochloride, M.P. 159–162° C.

EXAMPLE 2

A mixture of 61.1 g. (0.47 mole) of o-tolylacetonitrile, 100 g. (1.9 moles) of ammonium chloride, and 175 ml. of liquid ammonia is shaken in a stainless steel high-pressure vessel at 150° C. for 18 hours. The ammonia is evaporated and the crude product is slurried with 1 liter of ether to remove untreated starting materials, then extracted with 500 ml. of hot ethanol and filtered to remove ammonium chloride. The ethanol solution is concentrated, filtered, and the solid product, 2-(2-methylphenyl)acetamidine hydrochloride, recrystallized from acetonitrile. Yield: 48.2 g. (56% of theory). Melting point: 115–117° C.

I claim:
1. A compound represented by the following structure:

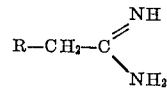

wherein R is o-chlorophenyl, o-tolyl, or α-napthyl.

2. The compound of claim 1 wherein R is o-chlorophenyl.
3. The compound of claim 1 wherein R is o-tolyl.
4. The compound of claim 1 wherein R is α-napthyl.

References Cited

Reynaud et al., Compt. Readers, vol. 262, pp. 665–7 (1966).

Chemical Abstracts, vol. 59, pp. 11522–23, Belgian Patent No. 618,598 (1963).

ROBERT V. HINES, *Primary Examiner.*

U.S. Cl. X.R.

260—453, 501.14; 424—326